US011418679B2

(12) United States Patent
    Watanabe

(10) Patent No.: US 11,418,679 B2
(45) Date of Patent: Aug. 16, 2022

(54) IMAGE PROCESSING APPARATUS, METHOD, AND CONTROL PROGRAM PRODUCT THAT COMBINES ADDITIONAL IMAGE TO FIT INTO BASE IMAGE AND CHANGES POSITION IN CASE OVERRUN OF BASE IMAGE

(71) Applicant: CANON KABUSHIKI KAISHA, Tokyo (JP)

(72) Inventor: Hitoshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/363,133

(22) Filed: Jun. 30, 2021

(65) Prior Publication Data
    US 2022/0014645 A1    Jan. 13, 2022

(30) Foreign Application Priority Data
    Jul. 10, 2020  (JP) .............................. JP2020-119292

(51) Int. Cl.
    *H04N 1/387*    (2006.01)
    *H04N 1/00*     (2006.01)
    *H04N 1/32*     (2006.01)

(52) U.S. Cl.
    CPC ....... *H04N 1/3871* (2013.01); *H04N 1/00395* (2013.01); *H04N 1/00411* (2013.01);
    (Continued)

(58) Field of Classification Search
    CPC ........... H04N 1/00395; H04N 1/00411; H04N 1/387; H04N 1/3871; H04N 1/3872;
    (Continued)

(56) References Cited
    U.S. PATENT DOCUMENTS 8,368,941 B2 *  2/2013  Niitsuma ................ G06T 11/60
                                                     358/1.18
    8,995,750 B2 *  3/2015  Ogishima ............... A63F 13/52
                                                       382/285
    (Continued)

FOREIGN PATENT DOCUMENTS

JP      2004005279 A    1/2004
    JP      2009058853 A    3/2009

*Primary Examiner* — Scott A Rogers
(74) *Attorney, Agent, or Firm* — Rossi, Kimms & McDowell LLP

(57) ABSTRACT

An image processing apparatus that is capable of preventing an additional image from being arranged at a position that overruns from a displayed base image when a user carelessly designates such a position. The image processing apparatus including an instruction unit that instructs a composition position by a user's operation at which an additional image selected by a user is combined with a base image displayed on a display, and a controller that controls so as to combine the additional image with the base image at a composition position instructed by the instruction unit. When the composition position where at least a part of the additional image overruns from the base image is instructed by the instruction unit, the controller changes the composition position so that the additional image will fit into the base image and combines the additional image at the changed composition position.

15 Claims, 4 Drawing Sheets

(52) U.S. Cl.
CPC ..... *H04N 1/32208* (2013.01); *H04N 1/32229* (2013.01); *H04N 2201/3271* (2013.01)

(58) Field of Classification Search
CPC ............. H04N 1/3873; H04N 1/32144; H04N 1/32208; H04N 1/32229; G06K 15/1889; G06T 11/60
See application file for complete search history.

(56) References Cited

U.S. PATENT DOCUMENTS 10,121,226 B2 * 11/2018 Masuko ................ G09G 5/377
2009/0059245 A1    3/2009 Konuma

* cited by examiner

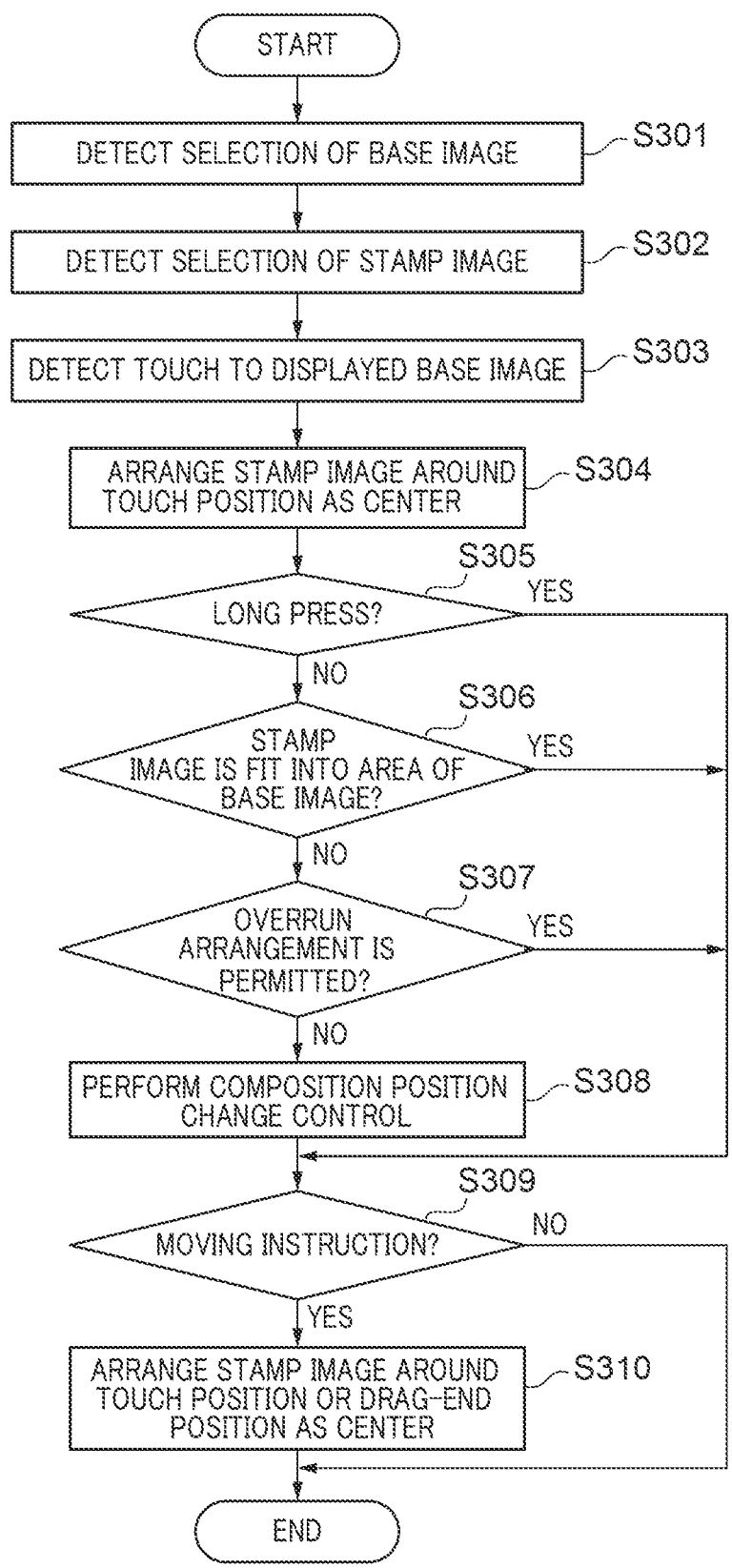

IMAGE PROCESSING APPARATUS, METHOD, AND CONTROL PROGRAM PRODUCT THAT COMBINES ADDITIONAL IMAGE TO FIT INTO BASE IMAGE AND CHANGES POSITION IN CASE OVERRUN OF BASE IMAGE

BACKGROUND OF THE INVENTION

Field of the Invention

The present invention relates to an image processing apparatus that combines an additional image with a base image, a control method therefor, and a storage medium storing a control program therefor.

Description of the Related Art

There is known an image processing apparatus that combines additional images that a user designates, such as a stamp image and a frame image, with a displayed base image. The image processing apparatus is provided with a function to assist arrangement of additional images by a user. Japanese Laid-Open Patent Publication (Kokai) No. 2009-58853 (JP 2009-58853A) suggests a related technique. According to the technique of JP 2009-58853A, an additional image is locally displayed so that a user can recognize a size and position of the additional image when the additional image is combined with a base image. Moreover, Japanese Laid-Open Patent Publication (Kokai) No. 2004-5279 (JP 2004-5279A) suggests a related technique. According to the technique of JP 2004-5279A, a position at which an additional image will be arranged is shown during a process of an operation of arranging the additional image.

However, since the techniques of the publications mentioned above allow a user to arrange an additional image freely, there is an apprehension that the user carelessly arranges an additional image at an unintended position, such as a position that overruns from a base image.

SUMMARY OF THE INVENTION

The present invention provides an image processing apparatus, a control method therefor, and a storage medium storing a control program therefor, which are capable of preventing an additional image from being arranged at a position that overruns from a displayed base image when a user carelessly designates such a position.

Accordingly, an aspect of the present invention provides an image processing apparatus including an instruction unit configured to instruct a composition position by a user's operation at which an additional image selected by a user is combined with a base image displayed on a display, and a controller configured to control so as to combine the additional image with the base image at a composition position instructed by the instruction unit. The controller changes the composition position so that the additional image will fit into the base image and combines the additional image with the base image at the changed composition position in a case where the composition position where at least a part of the additional image overruns from the base image is instructed by the instruction unit.

According to the present invention, an additional image is prevented from being arranged at a position that overruns from a displayed base image even when a user carelessly designates such a position.

Further features of the present invention will become apparent from the following description of exemplary embodiments with reference to the attached drawings.

BRIEF DESCRIPTION OF THE DRAWINGS

FIG. 3 is a flowchart showing procedures of a stamp arrangement control process executed by the image forming apparatus of FIG. 1.

DESCRIPTION OF THE EMBODIMENTS

Figure 1:
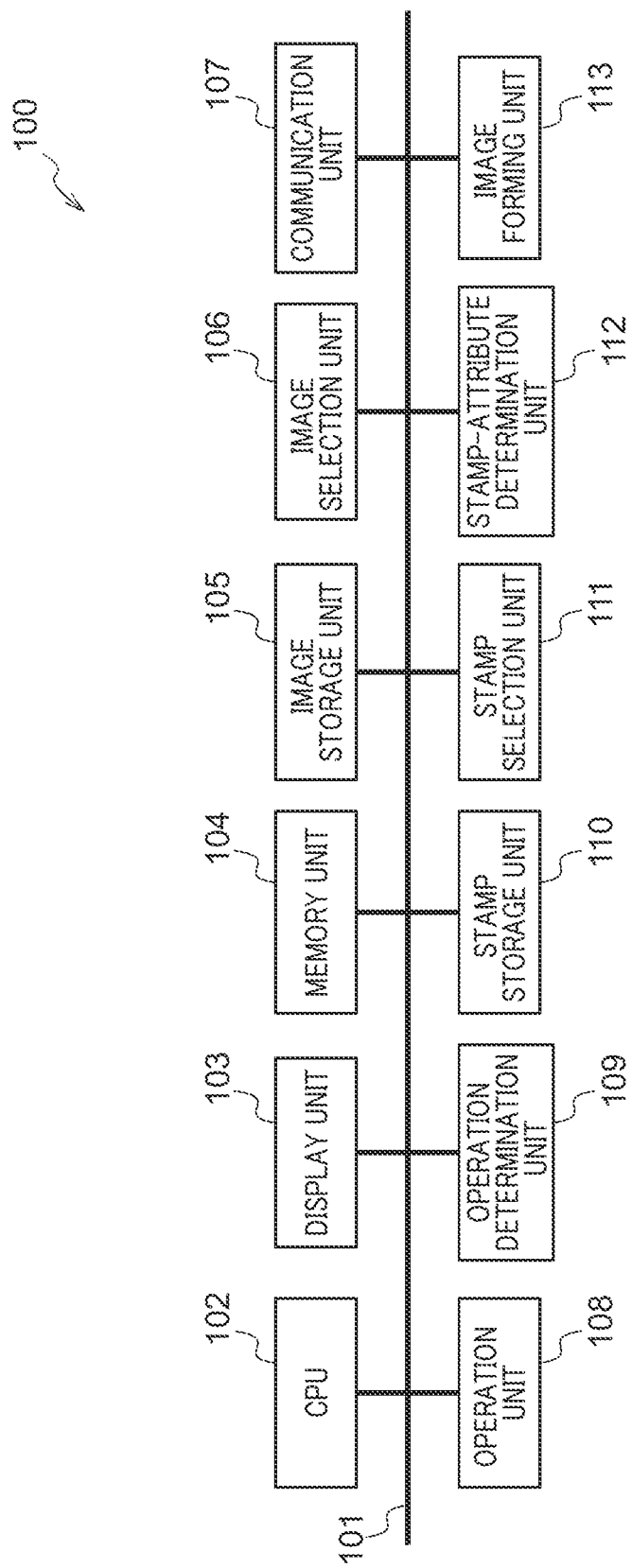
FIG. 1 is a block diagram schematically showing a configuration of an image forming apparatus according to an embodiment of the present invention.

Hereafter, embodiments according to the present invention will be described in detail by referring to the drawings. Although a case where the present invention is applied to an image forming apparatus will be described in the embodiment, an applying target of the present invention is not limited to the image forming apparatus. For example, the present invention may be applied to image processing apparatuses, such as a camera, a smart phone, a tablet terminal, and a PC, that can perform an image process to combine additional images, such as a stamp image and a frame image, with a displayed image.

FIG. 1 is a block diagram schematically showing a configuration of an image forming apparatus 100 as an image processing apparatus according to the embodiment of the present invention. As shown in FIG. 1, the image forming apparatus 100 is provided with a CPU 102, a display unit 103, a memory unit 104, an image storage unit 105, an image selection unit 106, a communication unit 107, an operation unit 108, an operation determination unit 109, a stamp storage unit 110, a stamp selection unit 111, a stamp-attribute determination unit 112, and an image forming unit 113. The CPU 102, display unit 103, memory unit 104, image storage unit 105, image selection unit 106, communication unit 107, operation unit 108, operation determination unit 109, stamp storage unit 110, stamp selection unit 111, stamp-attribute determination unit 112, and image forming unit 113 are connected mutually through a bus 101.

The CPU 102 outputs commands to the units connected through the bus 101 and controls the entire image forming apparatus 100. After start-up of the CPU 102, the CPU 102 reads base images stored in the image storage unit 105 and develops the read base images to the memory unit 104. Since the memory unit 104 has less memory capacity and higher reading/writing speeds as compared with the image storage unit 105, the memory unit 104 is used as a temporary storage area. The base images developed to the memory unit 104 are displayed on the display unit 103 in a thumbnail format. The operation unit 108 is arranged so as to be overlapped on the display unit 103. The display unit 103 and the operation unit 108 function as a touch panel.

The operation determination unit 109 determines a touch operation, a detaching operation, a dragging operation, etc. The touch operation is a user's operation to touch the operation unit 108 with a finger. The detaching operation is a user's operation to lift a finger that is touching the operation unit 108 from the operation unit 108. The dragging operation is a user's operation to move a finger that is touching the operation unit 108 to another position on the operation unit 108. When a user touches one of the base images displayed on the display unit 103 in the thumbnail format, the operation determination unit 109 obtains the position touched by the user from the operation unit 108 and obtains an image ID corresponding to the base image touched by the user by the image selection unit 106. The Image ID is an ID uniquely allocated to each base image stored in the image storage unit 105. The operation determination unit 109 specifies the base image selected by the user using the image ID. The specified base image is developed to the memory unit 104 from the image storage unit 105 and is displayed on the display unit 103.

The display unit 103 also displays an additional image that will be combined with the base image concerned. The additional image is a stamp image or a frame image, for example. Hereinafter, a case where a stamp image is used as an example of the additional image is described. Moreover, the display unit 103 displays a menu screen for designating an operation of the image forming apparatus 100. Furthermore, the display unit 103 displays a stamp icon for selecting a stamp image combining with a base image. When a user touches the stamp icon, stamp images stored in the stamp storage unit 110 are developed to the memory unit 104 and are displayed as a list on the display unit 103. When the user touches one of the stamp images displayed as the list, the operation determination unit 109 obtains the position touched by the user from the operation unit 108 and obtains a stamp ID corresponding to the stamp image touched by the user by the stamp selection unit 111. A stamp ID is an ID uniquely allocated to each stamp image stored in the stamp storage unit 110.

The stamp-attribute determination unit 112 determines an attribute of the stamp image corresponding to the stamp ID obtained by the stamp selection unit 111. The attribute of a stamp image is mentioned later. When the user selects a stamp image, the list display of the stamp images disappears and the base image will be displayed again. After that, when the user touches the base image, the previously selected stamp image is arranged on the base image so that the center of the stamp image will match the position touched by the user. Moreover, the user is able to rearrange the stamp image by touching another position or by dragging the stamp image to another position. When the user touches a completion icon displayed on the display unit 103, the position of the stamp image is fixed. The image forming unit 113 combines the stamp image with the base image at the fixed position mentioned above. Moreover, the image forming unit 113 prints the composite image with which the stamp image is combined. A new image ID is allocated to the composite image with which the stamp image is combined, and the composite image concerned is stored in the image storage unit 105. The image forming apparatus 100 can send the image stored in the image storage unit 105 to another apparatus through the communication unit 107 and can store the image received from another apparatus to the image storage unit 105.

Figure 2A:
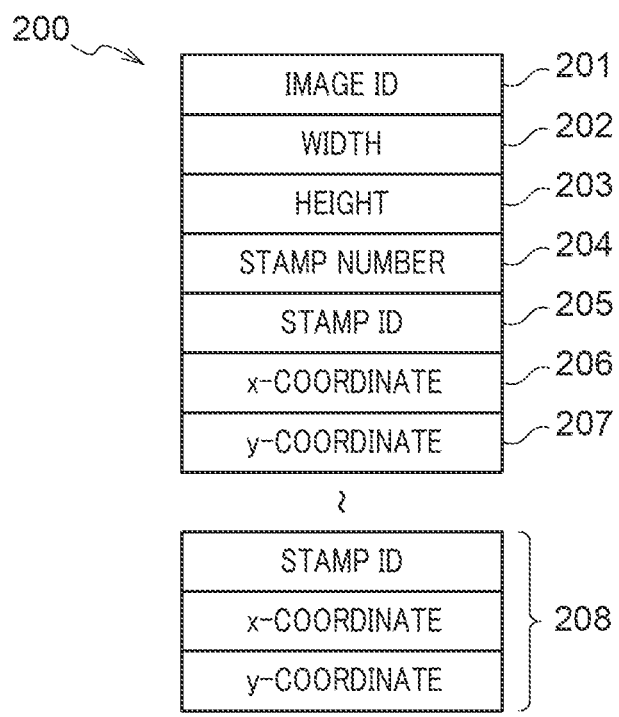
FIG. 2A and FIG. 2B are views showing configurations of data tables stored in a memory unit in FIG. 1.
Figure 2B:
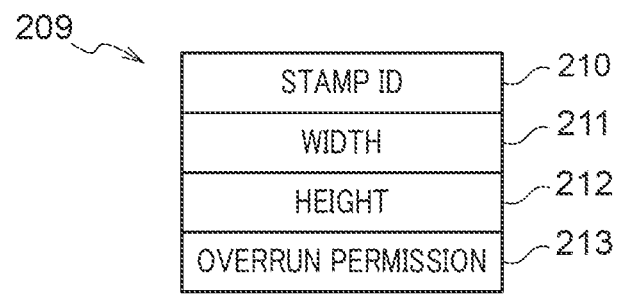

FIG. 2A and FIG. 2B are views showing configurations of data tables stored in the memory unit 104 in FIG. 1. FIG. 2A shows a configuration of an image data table 200 including data about the image currently displayed on the display unit 103. The image data table is stored in continuous areas in the memory unit 104. Each area corresponding to each item has data length of 4 bytes. The image data table 200 includes an image ID 201, a width 202, a height 203, a stamp number 204, a stamp ID 205, an x coordinate 206, and a y coordinate 207.

The image ID 201 is an ID allocated to the base image (hereinafter referred to as a "displayed base image") currently displayed on the display unit 103. The width 202 is a width of the displayed base image and its unit is a pixel. The height 203 is a height of the displayed base image and its unit is a pixel. The stamp number 204 is the number of the stamp images arranged on the displayed base image. The stamp ID 205 is an ID allocated to a stamp image arranged on the display base image. The x-coordinate 206 is an x-coordinate of the position where the stamp image corresponding to the stamp ID 205 is arranged on the displayed base image. The y-coordinate 207 is a y-coordinate of the position where the stamp image corresponding to the stamp ID 205 is arranged on the displayed base image. The x-coordinate 206 and y-coordinate 207 are relative coordinates of which an origin is an upper left corner of the displayed base image, and their units are pixels. Moreover, the x-coordinate 206 and y-coordinate 207 are the coordinates of the center of the stamp image. When the stamp images are arranged on the displayed base image, data sets 208 each of which consists of a stamp ID, an x-coordinate, and a y-coordinate are included in the image data table 200. The number of data sets 208 depends on the number of the arranged stamp images.

FIG. 2B is a block diagram showing a stamp data table 209 that stores the attribute of the stamp image arranged on the displayed base image. The stamp data table 209 includes a stamp ID 210, a width 211, a height 212, and an overrun permission 213.

The stamp ID 210 is an ID uniquely allocated to the stamp image arranged on the displayed base image. The width 211 is a width of the stamp image corresponding to the stamp ID 210, and its unit is a pixel. The height 212 is a height of the stamp image corresponding to the stamp ID 210, and its unit is a pixel. The overrun permission 213 is attribute information showing whether the arrangement of the stamp image corresponding to the stamp ID 210 at a position that overruns from the area of the displayed base image is permitted. When the overrun permission 213 is "0", it is determined that the arrangement of the stamp image corresponding to the stamp ID 210 at a position that overruns from the area of the displayed base image is permitted. When the overrun permission 213 is not "0", it is determined that the arrangement of the stamp image corresponding to the stamp ID 210 at a position that overruns from the area of the displayed base image is not permitted.

FIG. 3 is a flowchart showing procedures of a stamp arrangement control process executed by the image forming apparatus of FIG. 1. The stamp arrangement control process of FIG. 3 is achieved because the CPU 102 runs a program developed to the memory unit 104. The stamp arrangement control process of FIG. 3 is executed when the image forming apparatus 100 is started and when the base images developed to the memory unit 104 from the image storage unit 105 are displayed as the list on the display unit 103 in the thumbnail format.

As shown in FIG. 3, the CPU 102 detects selection of the base image by a user's operation (a step S301). Specifically, when detecting that the user touches one of the base images displayed on the display unit 103, the CPU 102 specifies the base image touched by the operation determination unit 109. The touched base image is developed to the memory unit 104 from the image storage unit 105 and is displayed on the display unit 103. When the base image is displayed on the display unit 103, the CPU 102 generates the image data table 200 corresponding to the displayed base image concerned. In this image data table 200, the ID of the displayed base image is set as the image ID 201. The width of the displayed base image is set as the width 202, and the height of the displayed base image is set as the height 203. Furthermore, since a stamp image is not combined with the displayed base image at this time point, "0" is set as the stamp number 204 of the image data table 200.

Next, when detecting that the user touches the stamp icon displayed on the display unit 103 together with the base image, the CPU 102 develops the stamp images stored in the stamp storage unit 110 to the memory unit 104. The CPU 102 displays the stamp images concerned on the display unit 103 as the list. Next, the CPU 102 detects selection of the stamp image by a user's operation (a step S302). Specifically, when detecting that the user touches one of the stamp images displayed on the display unit 103 as the list, the CPU 102 obtains the position that the user touched from the operation unit 108 by the operation determination unit 109. Moreover, the CPU 102 obtains a stamp ID corresponding to the stamp image that the user touched by the stamp selection unit 111. When the user selects the stamp image, the list display of the stamp images disappears and the base image will be displayed again.

Next, when detecting that the user touches the displayed base image (a step S303), the CPU 102 arranges the stamp image selected in the step S302 on the displayed base image as centering around the position (composition position) that the user touched (a step S304). When the stamp image is arranged on the displayed base image, the stamp data table 209 corresponding to the above-mentioned stamp image is generated on the basis of the data of the stamp image registered beforehand. In this stamp data table 209, the ID of the arranged stamp image is set as the stamp ID 210. The width of the arranged stamp image is set as the width 211, and the height of the arranged stamp image is set as the height 212. The value showing whether the arrangement (hereinafter referred to as an "overrun arrangement") of the stamp image at a position that overruns from the area of the displayed base image is permitted is set as the overrun permission 213. The CPU 102 updates the image data table 200 in parallel to generation of the stamp data table 209. Specifically, the number of the arranged stamp images is set as the stamp number 204 in the image data table 200. The ID of the arranged stamp image is set as the stamp ID 205. The x-coordinate and y-coordinate showing the center coordinate of the arranged stamp image are respectively set as the x-coordinate 206 and the y-coordinate 207.

Next, the CPU 102 determines whether the user's touch operation detected in the step S303 is a long press operation by the operation determination unit 109 (a step S305). In the step S305, the CPU 102 determines that the user's touch operation is the long press operation when a touch position and a detaching position are not changed mostly and when the user continues touching the touch position beyond a predetermined period, for example.

As a result of the determination in the step S305, when the user's touch operation is not the long press operation, i.e., when it is a short press operation, the CPU 102 determines whether the arranged stamp image fits into the area of the displayed base image (whether the stamp image is arranged inside the displayed base image) in a step S306. In the embodiment, the determination in the step S306 is performed on the basis of the center coordinate and size (width and length) of the stamp image that are obtained from the image data table 200 or the stamp data table 209. For example, when the center coordinate of the stamp image shows a position outside the area of the displayed base image or when at least a part of the stamp image overruns from the area of the displayed base image, the CPU 102 determines that the arranged stamp image does not fit into the area of the displayed base image. In the meantime, when the center coordinate of the stamp image shows a position inside the area of the displayed base image and when the stamp image does not overrun from the area of the displayed base image, the CPU 102 determines that the arranged stamp image fits into the area of the displayed base image.

The CPU 102 determines whether at least a part of the stamp image overruns from the area of the displayed base image on the basis of the obtained center coordinate and size (width and length) of the stamp image. For example, the CPU 102 compares distances between the center x-coordinate of the arranged stamp image and the left and right ends of the displayed base image with the half value of the width 211 (hereinafter referred to as a "width half value") of the arranged stamp image. Moreover, the CPU 102 compares distances between the center y-coordinate of the arranged stamp image and the upper and lower ends of the displayed base image with the half value of the height 212 (hereinafter referred to as a "height half value") of the arranged stamp image. When one of the distances to the left and right ends is less than the width half value of the stamp image or when one of the distances to the upper and lower ends is less than the height half value of the stamp image, the CPU 102 determines that at least a part of the stamp image overruns from the area of the displayed base image. In the meantime, when both the distances to the left and right ends are equal to or more than the width half value of the stamp image or when both the distances to the upper and lower ends are equal to or more than the height half value of the stamp image, the CPU 102 determines that the stamp image does not overrun from the area of the displayed base image.

As a result of the determination in the step S306, when the arranged stamp image does not fit into the area of the displayed base image, the CPU 102 determines whether the stamp image is permitted the overrun arrangement on the basis of the stamp data table 209 of the arranged stamp image (a step S307). In the step S307, when the overrun permission 213 of the above-mentioned stamp data table 209 is "0", the CPU 102 determines that the above-mentioned stamp image is permitted the overrun arrangement. In the meantime, when the overrun permission 213 of the above-mentioned stamp data table 209 is not "0", the CPU 102 determines that the above-mentioned stamp image is not permitted the overrun arrangement.

Figure 4A:
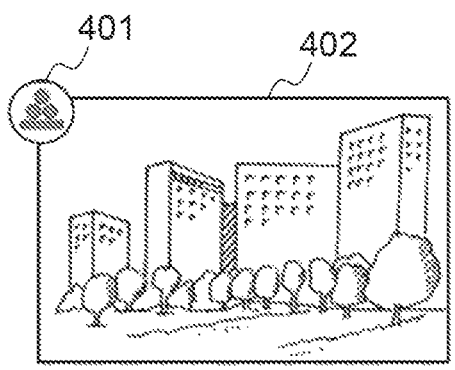
FIG. 4A through FIG. 4E are views for describing arrangement of a stamp image in the embodiment.
Figure 4B:
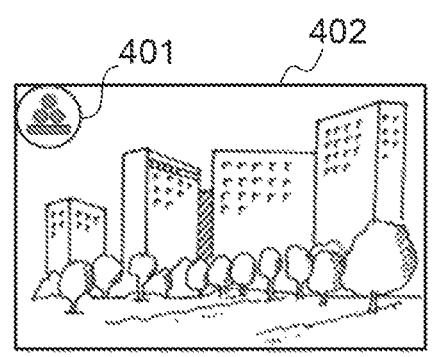

As a result of the determination in the step S307, when the above-mentioned stamp image is not permitted the overrun arrangement, the CPU 102 performs composition position change control that changes the composition position of the above-mentioned stamp image (a step S308). In the composition position change control, the CPU 102 changes the composition position of the stamp image from the position that the user's touch operation is detected to a position where the entire stamp image fits into the area of the displayed base image and where a moving amount from the position that the user's touch operation is detected in the step S303 becomes minimum. In this way, in the embodiment, when the stamp image 401 arranged by the user's touch operation does not fit into the area of the displayed base image 402 as shown in FIG. 4A, for example, and when the stamp image 401 is not permitted the overrun arrangement, the composition position of the stamp image 401 is changed to a position where the entire stamp image 401 fits into the area of the displayed base image and where a moving amount from the position that the user's touch operation is detected in the step S303 becomes minimum as shown in FIG. 4B. It should be noted that the composition position of the stamp image is changed to the position where the moving amount from the position that the user's touch operation is detected becomes minimum in the embodiment. However, the moving amount is not necessary to be minimum. The composition position may be changed to a position near the position that the user's touch operation is detected (a position corresponding to the position that the user's touch operation is detected).

Next, the CPU 102 determines whether a moving instruction (change instruction) for the stamp image is received from the user (a step S309). In the embodiment, the user is able to instruct movement of the stamp image by touching a position other than the position at which the stamp image is arranged or by dragging the stamp image to another position while touching the stamp image. In the step S309, when the operation determination unit 109 detects the above-mentioned operation, the CPU 102 determines that the moving instruction for the stamp image is received from the user. In the meantime, when the operation determination unit 109 does not detect the above-mentioned operation, the CPU 102 determines that no moving instruction is received from the user.

As a result of the determination in the step S309, when the moving instruction for the stamp image is not received from the user, the stamp arrangement control process is finished. As a result of the determination in the step S309, when the moving instruction for the stamp image is received from the user, the CPU 102 arranges the stamp image so that the user touch position or the drag-end position will match the center of the stamp image a step S310). After that, the stamp arrangement control process is finished.

As a result of the determination in the step S305, when the user's touch operation is the long press operation, the stamp arrangement control process proceeds to the step S309. That is, when the user's touch operation is the long press operation, the composition position change control is not performed regardless of whether the arranged stamp image fits into the displayed base image. That is, the stamp image is arranged at the user touch position detected in the step S303.

As a result of the determination in the step S306, when the stamp image fits into the area of the displayed base image, the stamp arrangement control process proceeds to the step S309.

As a result of the determination in the step S307, when the above-mentioned stamp image is permitted the overrun arrangement, the stamp arrangement control process proceeds to the step S309. That is, when the arranged stamp image does not fit in the area of the displayed base image and when the stamp image concerned is permitted the overrun arrangement, the composition position change control is not performed in the embodiment. Thus, the composition position of the stamp image on the displayed base image is fixed.

Figure 4C:
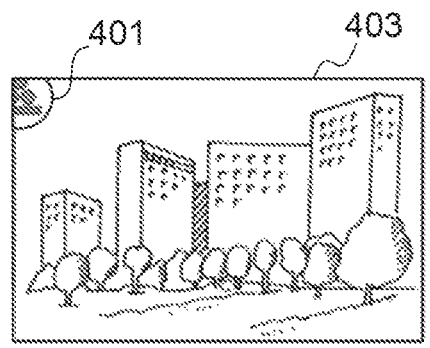

When the composition position of the stamp image on the displayed base image is fixed by the stamp arrangement control process, the image forming unit 113 combines the stamp image with the base image at the above-mentioned fixed position in the area of the displayed base image and generates a composite image. For example, when the stamp image 401 is arranged so that a part of the stamp image 401 will overrun from the area of the displayed base image 403, a composite image in a state where the overrun part of the stamp image is cut out is generated as shown in FIG. 4C. The image forming unit 113 allocates a new image ID to the generated composite image and stores the composite image concerned into the image storage unit 105. The composite image stored in the image storage unit 105 can be sent to another apparatus through the communication unit 107.

According to the above-mentioned embodiment, when the composition position where at least a part of the stamp image overruns from the displayed base image is instructed by the user's operation in the step S303, the composition position is changed to a position where the stamp image fits into the displayed base image and the stamp image is combined with the base image at the changed composition position concerned. Accordingly, the stamp image is prevented from being arranged at a position that overruns from the displayed base image even when a user carelessly designates such a position.

Moreover, in the embodiment mentioned above, when the composition position where at least a part of the stamp image overruns from the displayed base image is designated by a user's operation, the composition position is changed to a position where the moving amount from the composition position designated by the user's operation becomes minimum, and the stamp image is combined with the base image at the changed composition position. Accordingly, the stamp image can be arranged near the position that the user intends so as not to overrun from the displayed base image even when a user carelessly designates a position that overruns from the displayed base image. As a result, the stamp image can be arranged at the position that does not overrun from the displayed base image while reflecting the user's intention as much as possible.

Furthermore, in the embodiment mentioned above, when the user's touch operation detected in the step S303 is the long press operation, the stamp image is combined with the base image at the composition position designated by the user's operation, even if the composition position where at least a part of the stamp image overruns from the displayed base image is designated by the user's operation. Thereby, when the user wants to arrange the stamp image so as to overrun from the displayed base image, the stamp images may be arranged so as to overrun from the displayed base image by a simple operation like the long press operation.

In the embodiment mentioned above, when the change instruction to change the composition position of the stamp image to another position is received from the user, the stamp image is combined with the base image at the composition position designated by the change instruction, even if the composition position where at least a part of the stamp image overruns from the displayed base image is designated by the change instruction. Thereby, the composition position of the stamp image can be changed easily, which can reflect the user's intention about the composition position of the stamp image easily.

In the embodiment mentioned above, when the arranged stamp image is permitted the overrun arrangement, the composition position change control is not performed. This prevents the composition position change control from performing more than needed and avoids confusing the user in the arrangement of the stamp image.

Moreover, in the embodiment mentioned above, the image forming apparatus 100 prints the composite image that is obtained by combining the stamp image with the displayed base image. Accordingly, when a user carelessly designates a position that overruns from the displayed base image, the composite image in which the stamp image is arranged in such a position is prevented from printing unnecessarily.

Although the present invention is described using the embodiment mentioned above, the present invention is not limited to the embodiment mentioned above. For example, an additional image may be an image other than a stamp image and a frame image.

Moreover, it may be determined whether the overrun arrangement of the arranged stamp image is permitted on the basis of information other than the overrun permission 213. That is, additional images are classified into a first category that changes a composition position when at least a part of an additional image overruns from a base image and a second category that does not change a composition position in such a case. That is, the first category does not permit the overrun arrangement but the second category permits the overrun arrangement.

When a user can use a newly created stamp image or a stamp image that is obtained from another apparatus in addition to the stamp images beforehand prepared, it is extremely convenient for the user. As the attribute information about such a stamp image, an image size is defined for each stamp image, is easily registered beforehand for each stamp image, and is not changed after registration. In the meantime, since overrun permission of a stamp image varies depending on a user's use state, it may be difficult to register beforehand for each stamp image. Moreover, since it is necessary to change the setting of the overrun permission 213 depending on the user's use state, time and effort occur.

As compared with this, it may be determined whether a stamp image is permitted an overrun arrangement (i.e., the first category or the second category) on the basis of the size information beforehand registered as the attribute information to the stamp image. For example, a stamp image of which a size is less than a predetermined size is extremely high in possibility that a user cannot recognize a content of the stamp image when a part thereof is cut off. Such a stamp image is determined to belong to the first category that does not permit the overrun arrangement and can perform the composition position change control. In the meantime, a stamp image of which a size is equal to or more than the predetermined size is low in possibility that a user cannot recognize a content of the stamp image when a part thereof is cut off. Such a stamp image is determined to belong to the second category that permits the overrun arrangement and does not perform the composition position change control. Such a process enables the control of the composition position of the stamp image so that the user can recognize the content of the stamp image even when a part thereof is cut off without using the setting of the overrun permission 213.

Figure 4D:
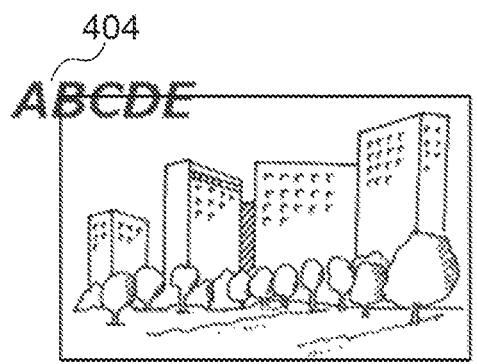
Figure 4E:
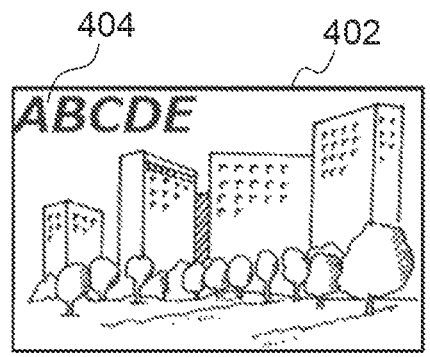

Moreover, information that can distinguish whether a stamp image includes a character may be employed as the attribute information, for example. The information showing whether a stamp image includes a character is defined for each stamp image as with the size of the stamp image, is easily registered beforehand for each stamp image, and is not changed after registration. A stamp image 404 including characters as shown in FIG. 4D has possibility that a user cannot recognize a content of the stamp image 404 when a part of the characters is cut off. Accordingly, the stamp image to which the attribute information showing that a character is included is registered beforehand is determined to belong to the first category that does not permit the overrun arrangement. Such a stamp image is subjected to the composition position change control. For example, the composition position of the stamp image 404 is changed to the position that fits in the area of the displayed base image 402 as shown in FIG. 4E. In the meantime, a stamp image that does not include a character is low in possibility that a user cannot recognize a content of the stamp image when a part thereof is cut off. Accordingly, the stamp image to which the attribute information showing that a character is not included is registered beforehand is determined to belong to the second category that permits the overrun arrangement and does not perform the composition position change control. Such a process enables the control of the composition position of the stamp image so that the user can recognize the content of the stamp image even when a part of characters that constitute the stamp image is cut off without using the setting of the overrun permission 213.

Moreover, information that can distinguish whether a stamp image includes a face image may be employed as the attribute information. The information showing whether a stamp image includes a face image is defined for each stamp image as with the size of the stamp image, is easily registered beforehand for each stamp image, and is not changed after registration. A stamp image that includes a face image has possibility that a user cannot recognize a content of the stamp image when a part of the face image is cut off. Accordingly, the stamp image to which the attribute information showing that a face image is included is registered beforehand is determined to belong to the first category that does not permit the overrun arrangement and performs the composition position change control. In the meantime, a stamp image that does not include a face image is low in possibility that a user cannot recognize a content of the stamp image when a part thereof is cut off. Accordingly, the stamp image to which the attribute information showing that a face image is not included is registered beforehand is determined to belong to the second category that permits the overrun arrangement and does not perform the composition position change control. Such a process enables the control of the composition position of the stamp image so that the user can recognize the content of the stamp image even when a part of a face image that constitutes the stamp image is cut off without using the setting of the overrun permission 213.

Furthermore, in the embodiment mentioned above, the attribute information may be information that can distinguish whether a stamp image includes a simple figure or continuous pattern figures. The information showing whether a stamp image includes a simple figure or continuous pattern figures is defined for each stamp image as with the size of the stamp image, is easily registered beforehand for each stamp image, and is not changed after registration. A stamp image that includes a simple figure or continuous pattern figures is determined to belong to the second category that permits the overrun arrangement and does not perform the composition position change control. Such a process can improve convenience by increasing the degree of freedom of arrangement of a stamp image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-119292, filed Jul. 10, 2020, which is hereby incorporated by reference herein in its entirety.

What is claimed is:

1. An image processing apparatus comprising:
an instruction unit configured to instruct a composition position by a user's operation at which an additional image selected by a user is combined with a base image displayed on a display; and
a controller configured to control so as to combine the additional image with the base image at a composition position instructed by the instruction unit,
wherein the controller changes the composition position so that the additional image will fit into the base image and combines the additional image with the base image at the changed composition position in a case where the composition position where at least a part of the additional image overruns from the base image is instructed by the instruction unit.

2. The image processing apparatus according to claim 1, wherein the controller changes the composition position to a position where the additional image fits into the base image and where a moving amount from the composition position instructed by the instruction unit becomes minimum and combines the additional image with the base image at the changed composition position in the case where the composition position where at least a part of the additional image overruns from the base image is instructed by the instruction unit.

3. The image processing apparatus according to claim 1, wherein the instruction unit is a touch panel provided on the display.

4. The image processing apparatus according to claim 1, wherein the controller changes the composition position so that the additional image will fit into the base image and combines the additional image with the base image at the changed composition position in a case where the composition position where at least a part of the additional image overruns from the base image is instructed by the instruction unit according to a user's operation of a first type, and
wherein the controller combines the additional image with the base image at the composition position instructed by the instruction unit in a case where the composition position is instructed by the instruction unit according to a user's operation of a second type, even in the case where the composition position where at least a part of the additional image overruns from the base image is instructed by the instruction unit.

5. The image processing apparatus according to claim 4, wherein the user's operation of the first type is a short press operation and the user's operation of the second type is a long press operation.

6. The image processing apparatus according to claim 5, wherein the controller combines the additional image with the base image at the composition position instructed by the instruction unit in a case when the composition position is instructed by the instruction unit according to the long press operation, even in the case where the composition position where at least a part of the additional image overruns from the base image is instructed by the instruction unit.

7. The image processing apparatus according to claim 1, further comprising a change instruction unit configured to receive a change instruction to change the composition position of the additional image according to a user's operation after combining the additional image with the base image at the changed composition position that is changed from the composition position instructed by the instruction unit,
wherein the controller combines the additional image with the base image at a composition position instructed by the change instruction received by the change instruction unit in a case where the change instruction to change the composition position is received by the change instruction unit, even in a case where at least a part of the additional image overruns from the base image.

8. The image processing apparatus according to claim 1, wherein the controller changes the composition position so that the additional image will fit into the base image and combines the additional image with the base image at the changed composition position in a case where the additional image belongs to a first category and the composition position where at least a part of the additional image overruns from the base image is instructed by the instruction unit, and
wherein the controller combines the additional image with the base image at the composition position instructed by the instruction unit in a case where the additional image belongs to a second category, even in the case where the composition position where at least a part of the additional image overruns from the base image is instructed by the instruction unit.

9. The image processing apparatus according to claim 8, wherein attribute information that identifies whether the additional image belongs to one of the first category and the second category is beforehand set to the additional image.

10. The image processing apparatus according to claim 9, wherein a stamp image of which an image size is less than a predetermined size belongs to the first category and a stamp image of which an image size is not less than the predetermined size belongs to the second category.

11. The image processing apparatus according to claim 8, wherein the stamp image of the first category includes a character, and the stamp image of the second type does not include a character.

12. The image processing apparatus according to claim 8, wherein the stamp image of the first category includes a face image, and the stamp image of the second category does not include a face image.

13. The image processing apparatus according to claim 1, further comprising a print unit configured to print a composite image that is obtained by combining the additional image with the base image.

14. A control method for an image processing apparatus that combines an additional image selected by a user with a base image displayed on a display, the control method comprising:
- instructing a composition position by a user's operation at which the additional image is combined with the base image; and
- controlling to combine the additional image with the base image at the composition position instructed,
- wherein the composition position is changed so that the additional image will fit into the base image and the additional image is combined with the base image at the changed composition position in a case where the composition position where at least a part of the additional image overruns from the base image is instructed.

15. A non-transitory computer-readable storage medium storing a control program causing a computer to execute a control method for an image processing apparatus that combines an additional image selected by a user with a base image displayed on a display, the control method comprising:
- instructing a composition position by a user's operation at which the additional image is combined with the base image; and
- controlling to combine the additional image with the base image at the composition position instructed,
- wherein the composition position is changed so that the additional image will fit into the base image and the additional image is combined with the base image at the changed composition position in a case where the composition position where at least a part of the additional image overruns from the base image is instructed.

* * * * *